Nov. 29, 1960    H. BENDER    2,961,750
BONDING PROCESS
Filed Aug. 30, 1957

INVENTOR
HARRY BENDER
BY
ATTORNEY

United States Patent Office 2,961,750
Patented Nov. 29, 1960

2,961,750

BONDING PROCESS

Harry Bender, Albertson, N.Y., assignor, by mesne assignments, to Sylvania Electric Products Inc., Wilmington, Del., a corporation of Delaware Filed Aug. 30, 1957, Ser. No. 681,226

5 Claims. (Cl. 29—169.5)

My invention is directed toward phonograph styli and methods for making the same.

So-called "diamond needles," i.e. phonograph styli, each of which comprises a metal shank with a diamond tip permanently secured to one end thereof, are widely used at the present time.

I have invented a new process for producing phonograph styli of the character indicated at a lower cost and with a more adherent diamond-metal bond than heretofore obtainable.

Accordingly it is an object of the present invention to provide a new and improved process of the character indicated.

Another object is to provide a new and improved process for permanently bonding a diamond tip to a metal shank.

Still another object is to provide a new and improved process for permanently bonding a diamond tip to a metal shank, said process being characterized by the separate application of flux and solder to the diamond and shank.

These and other objects of my invention will either be explained or will become apparent hereinafter.

In accordance with the principles of my invention, a frusto-conical opening is cut into one end of a metal shank. With the shank held in an upright position, the opening being in the top of the shank, a diamond chip is placed in the opening, the chip having been previously coated with a titanium or zirconium hydride flux. A measured amount of solder capable of wetting both the metal and the diamond and having a melting point within the approximate range 600°–800° C. is then placed on top of the diamond chip. The entire assembly is then fired in an oxygen-free atmosphere to a temperature falling within the approximate range 850°–1050° C. to bond the chip to the shank. Finally, the excess metal adjacent the chip is cut away and the chip is ground to finished shape.

An illustrative embodiment of my invention will now be described with reference to the accompanying drawings wherein Figs. 1–4 illustrate various steps in the process described above.

Figure 1:
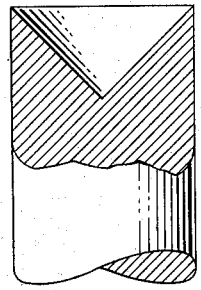
Figure 1 is a side view, partially in section, of the metal shank to which a diamond tip is to be bonded.
Figure 2:
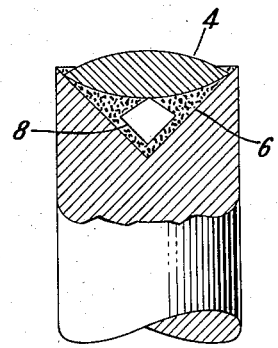
Figure 2 is a side view, partially in section, of the metal shank and diamond tip assembled for bonding but prior to the bonding step.
Figure 3:
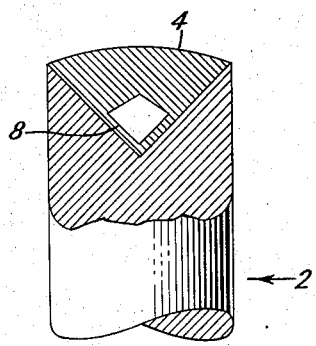
Figure 3 is a side view, partially in section, of the metal shank with the diamond tip bonded thereto.

Referring now to the drawings, a frusto-conical opening 10 is cut into one end of a metal shank 2. The shank, which, for example can be fabricated of copper, steel or various copper or steel alloys, must then be thoroughly cleaned.

After the shank is cleaned and mounted upright in a suitable jig with opening 10 pointed upwards, the opening is coated with titanium or zirconium hydride flux 6. A diamond chip 8 is also coated with this flux and placed inside the opening. A piece of solder 4 is placed over the chip, the weight of the solder pressing downward on the chip and holding same in position.

The assembly is then loaded into a furnace and is fired in a dry oxygen-free atmosphere, such as argon, hydrogen or a vacuum, to a temperature falling within the range 850°–1050° C. for a period of 5–10 minutes to bond said chip to said shank. (When the firing process is carried out in vacuum, I have found that best results are obtained when the pressure does not exceed about $2 \times 10^{-4}$ millimeters of mercury.)

Figure 4:
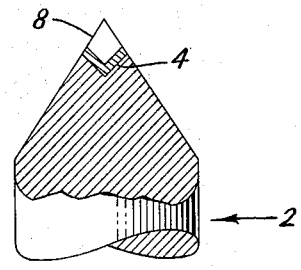
Figure 4 is a side view, partially in section of the metal shank with the diamond tip bonded thereto and with the excess metal removed.

After cooling, the assembly is removed from the furnace. The excess metal is cut away, and the diamond chip is ground to finished shape to produce the stylus as shown in Fig. 4.

As indicated previously, the shank must be thoroughly cleaned before the diamond chip is placed therein. While other cleaning techniques can be used, I have obtained excellent results by first dipping the shank in a dichromatic-sulfuric acid glass cleaning solution, then firing the shank first in wet hydrogen then in dry hydrogen at temperatures falling within the approximately range 1000°–1300° C. to volatize and drive off all contaminants, such as sulfur, from the body of the shank.

The titanium or zirconium hydride flux can be applied in the form of freshly prepared powder or, if desired, can be applied as a dispersion of powder in a suitable vehicle, such as amyl acetate or nitrocellulose.

The solder can be, for example, of the copper-silver type, such as a silver-copper eutectic alloy, or an indium-copper-silver alloy commercially designated as Incosil 15, or any other solder capable of wetting the metal and the diamond and having a melting point fall within the ap-diamond and having a melting point falling within the applied either in solid form or as a powder, as long as the solder is applied on top of the diamond chip and is thereby able to hold the chip in place during the bonding process.

While I have shown and pointed out my invention as applied above, it will be apparent to those skilled in the art that many modifications can be made within the scope and sphere of my invention as defined in the claims which follow.

What is claimed is:

1. A method for bonding a diamond chip to a metal shank containing a conical recess in one end thereof, said method comprising the steps of vertically suspending said shank with said recess pointing upward; coating said chip with a flux selected from the group consisting of the hydrides of titanium and zirconium; placing said coated chip in said recess; placing solder adapted to wet both said metal and said diamond and having a melting point falling within the approximate range 600°–800° C. on top of said chip, thereby holding said chip in position; and firing the resultant assembly in a dry oxygen-free atmosphere to a temperature falling within the approximate range 850°–1050° C. to bond said chip to said shank.

2. The method as set forth in claim 1 wherein said solder is of the copper-silver type.

3. The method as set forth in claim 1 wherein said atmosphere is a vacuum.

4. A method for bonding a diamond chip to a metal shank containing a conical recess in one end thereof, said method comprising the steps of vertically suspending said shank with said recess pointing upward; coating said chip with a flux selected from the group consisting of the hydrides of titanium and zirconium; placing said coated chip in said recess; placing solder adapted to wet both said metal and said diamond and having a melting point falling within the approximate range 600°–800° C. on top of said chip, thereby holding said chip in position; firing the resultant assembly in a dry oxygen-free atmosphere to a temperature falling within the approximate range 850°–1050° C. to bond said chip to said shank; removing the excess metal about said opening; and shaping said chip into a pointed tip.

5. A method for bonding a diamond chip to a metal shank containing a conical recess in one end thereof, said method comprising the steps of vertically suspending said shank with said recess pointing upward; coating said chip with a flux selected from the group consisting of the hydrides of titanium and zirconium; placing said coated chip in said recess; placing solder of the copper-silver type having a melting point falling within the approximate range 600°–800° C. on top of said chip, thereby holding said chip in position; and firing the resultant assembly in a vacuum to a temperature falling within the approximate range 850°–1050° C. to bond said chip to said shank, said vacuum having a maximum pressure of about $2 \times 10^{-4}$ millimeters of mercury.

References Cited in the file of this patent

UNITED STATES PATENTS

| | | |
|---|---|---|
| 1,178,687 | Strickland | Apr. 11, 1916 |
| 1,677,055 | Simons | July 10, 1928 |
| 2,194,546 | Goddu et al. | Mar. 26, 1940 |
| 2,570,248 | Kelley | Oct. 9, 1951 |
| 2,686,958 | Eber et al. | Aug. 24, 1954 |
| 2,724,892 | Knochel et al. | Nov. 29, 1955 |
| 2,739,375 | Coxe | Mar. 27, 1956 |
| 2,820,534 | Hume | Jan. 21, 1958 |